TAPE CARTRIDGE AND LOADING MECHANISM

Filed Jan. 8, 1960 6 Sheets-Sheet 1

INVENTOR
EARL D. BARKHUFF

BY [signature]

ATTORNEY

Oct. 17, 1961 E. D. BARKHUFF 3,004,729

TAPE CARTRIDGE AND LOADING MECHANISM

Filed Jan. 8, 1960 6 Sheets-Sheet 2

Oct. 17, 1961 E. D. BARKHUFF 3,004,729

TAPE CARTRIDGE AND LOADING MECHANISM

Filed Jan. 8, 1960 6 Sheets-Sheet 3

TAPE CARTRIDGE AND LOADING MECHANISM

Filed Jan. 8, 1960

6 Sheets-Sheet 5

United States Patent Office 3,004,729
Patented Oct. 17, 1961

3,004,729

TAPE CARTRIDGE AND LOADING MECHANISM

Earl D. Barkhuff, Poughkeepsie, N.Y., assignor to International Business Machines Corporation, New York, N.Y., a corporation of New York

Filed Jan. 8, 1960, Ser. No. 1,387
14 Claims. (Cl. 242—55.13)

This invention relates to a record tape cartridge and a machine for manipulating and processing cartridge encased record tapes.

More particularly, the invention relates to automatic reel loading and unloading mechanism for inclusion in a tape transport of the kind shown in James A. Weidenhammer et al. United States Patent 2,792,217, and to a tape reel cartridge for use therewith. The invention contemplates improved mechanism capable of loading and unloading substantially hermetically sealed reels of record tape into and out of operative position upon the reel driving spindles of a tape transport mechanism utilized in tape record processing systems.

It has heretofore been proposed in the commonly owned application for United States patent, entitled "Record Tape Loading Mechanism," Serial No. 741,544, filed June 12, 1958 by Thomas U. Burke et al., now patent 2,941,739, dated June 21, 1960, to provide automatic record tape loading mechanism of the kind above characterized. This invention insofar as it relates to the automatic cartridge loading and unloading features is, therefore, an improvement upon the device described in said Burke et al. patent.

A tape reel enclosure or cartridge designed for use in conjunction with the loading and unloading mechanism of the aforesaid Burke et al. patent is specifically disclosed and claimed in the commonly owned application for United States patent, entitled "Tape Cartridge and Tape Loading Mechanism," Serial No. 745,698, filed June 30, 1958 by Malvin S. Bilsvack, now patent 2,941,741, dated June 21, 1960. The tape reel cartridge of the present invention is not only specifically adapted for use with the novel loading and unloading mechanism herein, but it also represents an improvement over the cartridge disclosed in said Bilsback patent, particularly in regard to the dust-tight character thereof.

The tape reel cartridge and the cartridge loading and unloading mechanism have particular utility in an automatic tape reel library system such as that disclosed and claimed in the commonly owned application for United States patent, entitled "Automatic Record Tape Handling and Loading Mechanism," Serial No. 741,543, filed June 12, 1958 by Thomas U. Burke et al., now patent 2,941,738, dated June 21, 1960.

It is a particular object of this invention to provide for modifications in a record tape handling and processing system which will insure the substantially dust-free storage and processing of magnetic record tape. A large share of the errors and extraneous noise encountered in th processing of magnetic tape records is caused by the presence of particles of foreign matter, such as dust, on the tape. This difficulty is particularly evident while processing tape having data magnetically recorded thereon at high record density. Since the art can envision magnetic records of increasing density, the problem is one of increasing importance.

It is, therefore, the purpose of this invention to provide a system for magnetic record tape handling in which the tape and the processing instrumentalities are protected against the contaminating influence of dust, or the like, entrained in the atmosphere.

It is a further object of this invention to provide a tape reel cartridge which will constitute an improved permanent protective covering for the reels of tape therein, and which is adapted to automatic manipulation within a tape reel storage and processing system.

It is a still further object of this invention to provide a tape transport mechanism for use in record tape storage and processing systems which embodies improved means for automatically and mechanically mounting encased tape reels upon and demounting them from the reel driving spindles of the tape transport.

It is yet a further object of this invention to provide a substantially dust-tight magnetic record tape cartridge and a tape transport having inter-engaging and cooperating elements which maintain the record tape and the tape processing area shielded against dust and the like while a tape record is being processed.

The tape transport herein comprises as essential elements a face panel, a pair of tape reel driving spindles mounted in the panel, and a tape processing head mounted at the face of the panel such that a tape running from one reel to the other will move over the head for reading therefrom or recording thereon. Extending forwardly from the face panel is an annular hood which, together with the face panel, provides an open faced shield by which the reel spindles and the tape processing head are partially enclosed.

A tape reel cartridge of novel design cooperates with the open face of the annular hood to substantially seal the tape processing enclosure while tape is being processed. To this end, the cartridge includes a tape reel enclosing shell having a face panel and side walls, a separable reel mounting panel adapted to constitute an enclosing rear wall for the shell and form with the shell a substantially dust-tight tape reel enclosure. The reel mounting panel has a pair of reel hub apertures through which extend the hubs of a pair of tape reels having closed drive spindle sockets. The reels have a sealing annulus adapted to seat against the inner face of the reel mounting panel, and resilient means are provided within the cartridge for mounting the reels under a yielding pressure such that the sealing annuli are pressed into engagement with the inner face of the reel mounting panel.

The reel mounting panel is held in dust-tight engagement with the annular walls of the cartridge shell by resilient means, and the outer face of the reel mounting panel is provided with means engageable by reel loading mechanism which adapts the cartridge to automatic loading and unloading.

At the front of the transport is a tape reel cartridge support which is adapted to hold a reel cartridge with the reel hubs therein in axial alignment with the reel driving spindles. The transport also has a plurality of reel cartridge engaging arms mounted for reciprocation through the face panel thereof. As a consequence of this arrangement, a tape reel cartridge, mounted on the cartridge support at the face of the transport and engaged by the reel cartridge engaging arms, can be moved by mechanical means toward the face panel of the transport such that the shell of the cartridge is first drawn into dust-tight contact with the annular hood, and upon further operation of the cartridge engaging arms, the reel mounting panel will be separated from its shell against the tension of its resilient connection with the shell until the reel hubs are mounted in operative relation upon the respective reel spindles. Thus, there is provided a simple and effective system for protecting the tape reels not only during storage and transportation thereof, but also during the processing thereof on the tape transport.

The novel features characteristic of the invention are set forth with particularity in the appended claims. The invention itself, however, both as to its organization and method of operation, together with further objects and advantages thereof, may best be understood by reference to the following description, taken in connection with the accompanying drawings, in which drawings like reference reference numerals indicate like parts, and in which:

Figure 1:
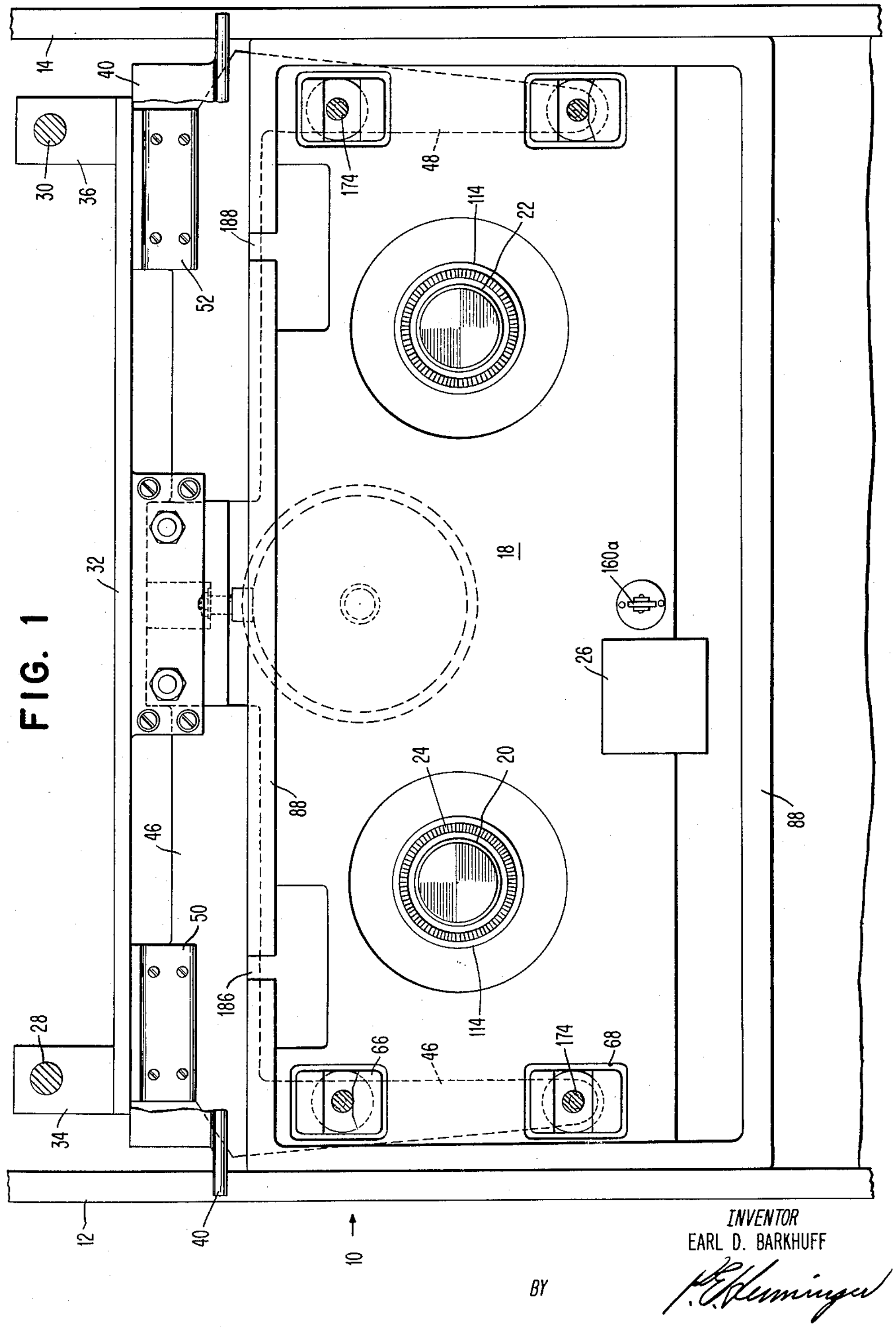
FIG. 1 is an elevational view of the upper portion of a tape transport, illustrating the face panel thereof.

The mechanism of the tape transport 10 is suported on a suitable framework including a plurality of upright frame members such as 12, 14 and 16. Mounted between the upright frame members 12 and 14 is a face panel 18. Extending through the face panel 18 are a pair of reel driving spindles 20 and 22. These spindles are driven from the rear of the face panel in any suitable manner well known in the art. The head of the spindles 20 and 22 projecting forwardly from the face panel 18 is generally cup-shaped and includes clutching teeth 24 adapted to engage similar clutching teeth on a correspondingly shaped reel hub, as to be shown hereinafter. Mounted on the face panel at a point somewhat below the drive spindles 20 and 22 is a transducer 26 by which a magnetic tape can be processed.

Figure 3:
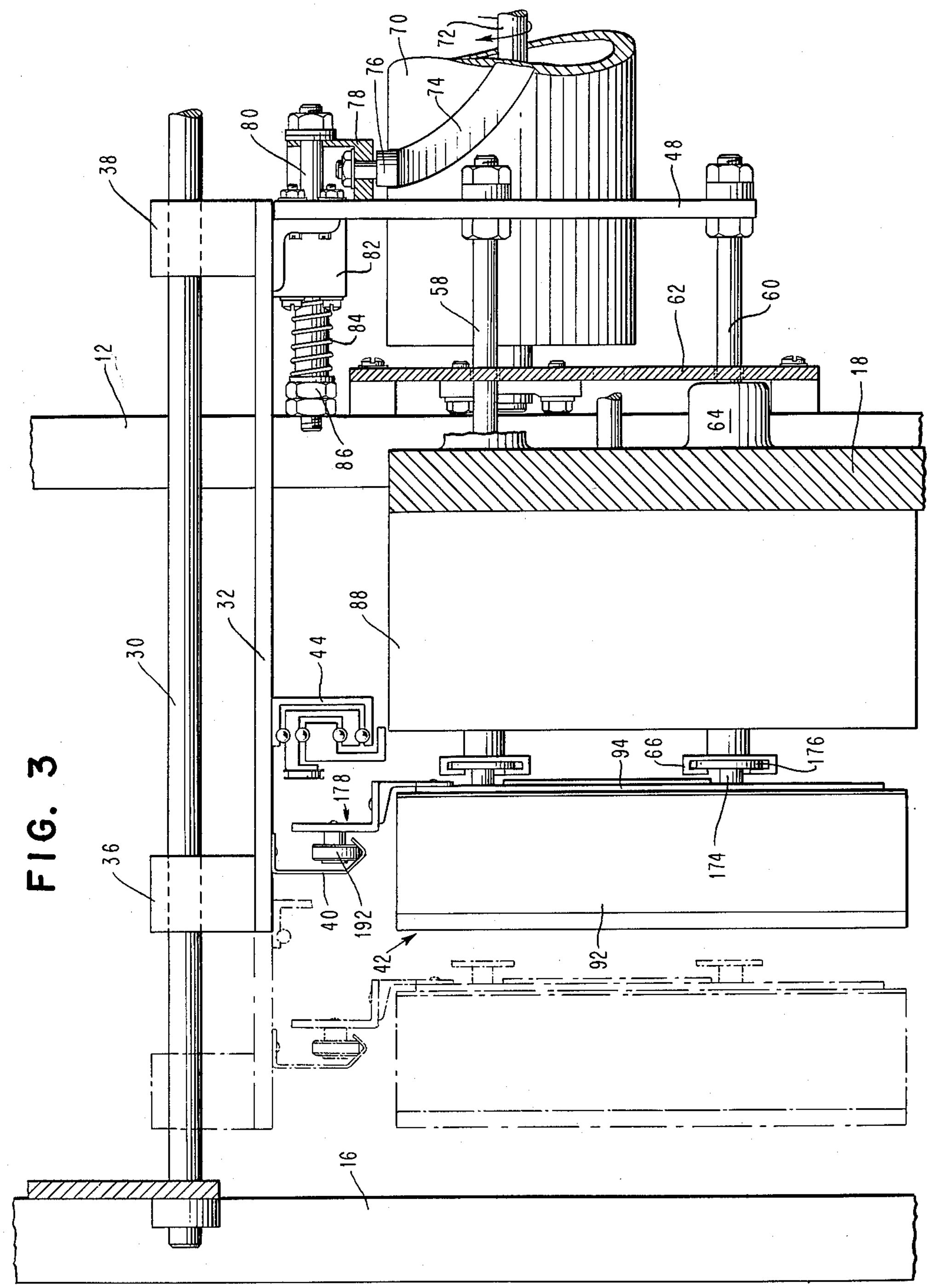
FIG. 3 is a side elevational view, partly in section, taken from the right of FIG. 2.

Above the face panel 18 and extending to the front and rear thereof are a pair of guide rods 28 and 30 (see also Fig. 3). The forward ends of these rods are supported by the upright frame members at the front of the transport and the rear ends are similarly supported by a pair of upright frame members to the rear of the face panel. The guide rods 28 and 30 support the mechanism by which tape reel cartridges are manipulated and tape reels therein are mounted upon and demounted from the reel driving spindles. This mechanism is carried by a supporting plate 32 and the supporting plate is mounted for reciprocation on the guide rods by means of bearing brackets 34 and 36 at the front of the plate and by a similar set of brackets, such as the bracket 38, at the back of the plate. Fixed to the bottom of the supporting plate 28 and depending therefrom near the front edge thereof is a track element 40. This track element is adapted to support a tape reel cartridge 42. Immediately behind the track element 40 is a slide structure 44 which is extensible in a lateral direction for engaging and moving tape reel cartridges onto the track element 40 from a laterally located storage position. The arrangement of the track element 40 and elements in lateral alignment therewith, as well as the details of the slide structure 44, are all fully illustrated and described in the aforesaid Burke et al. United States Patent 2,941,738.

A pair of laterally spaced rigid arms 46 and 48 (see also FIG. 1) are fixed to the rear edge of the supporting plate 32 by means of brackets 50 and 52, respectively, such that the arms 46 and 48 extend downwardly at the rear of the face panel 18. Each of the arms 46 and 48 has rigidly attached thereto a pair of rods (FIGS. 1 and 3) which extend forwardly through the face panel 18. Thus, as seen in FIG. 1, the arm 46 carries an upper rod 54 and a lower rod 56, while the arm 48 carries an upper rod 58 and a lower rod 60. The rods are symmetrically spaced with respect to each other such that the upper and lower rods of the opposite pairs are in horizontal alignment with each other and the upper and lower rods of the respective pairs are in vertical alignment with each other.

The rods 54, 56, etc., extend forwardly through a bearing plate 62 (FIG. 3) located at the rear of the face panel 18 and through elongated bearing hubs such as the hub 64 formed in the face panel 18. Each of the rods terminates at its free end in a head socket 66 adapted to engage an element of the tape reel cartridge during loading and unloading thereof. A recess 68 (FIGS. 1 and 5) is formed in the face panel 18 at each rod location so that its head socket 66 can be drawn completely into the facial plane of the face panel when the rods are fully retracted.

The supporting plate 32 is reciprocated into any desired position along the length of its guide rods by mechanism mounted behind the face panel. As shown in FIG. 3, a barrel cam 70 may be used for this purpose. The barrel cam 70 is mounted on a shaft 72 which has its forward end journalled in the bearing plate 62. A cam groove 74 of suitable shape is formed in the face of the cam barrel and this groove is engaged by a cam groove follower 76 supported from the structure connected to the supporting plate 32. The cam groove follower 76 is preferably yieldingly mounted to permit a slight overrun of the drum cam 70 as the supporting plate 32 is fully retracted. Accordingly, as shown in FIG. 3, it projects downwardly from a mounting bracket 78 which is located at the rear of the arms 46 and 48 and is attached to a downwardly extending supporting plate flange by a bolt 80 which passes through an upstanding flange of the mounting bracket 78. The bolt 80 passes forwardly through a bearing bracket 82 and is maintained under spring tension tending to project it in a forward direction by means of a spring 84 coiled about the shank of the bolt and abutting the bearing bracket 82 and a nut 86, respectively, at its opposite ends.

From the foregoing, it can be seen that as the barrel cam 70 is rotated, the cam groove follower 76 following in the cam groove 74 will cause the supporting plate 32 to move along its guide rods. As a result of this movement, a tape reel cartridge supported on the track element 40 can be moved toward and away from the face panel of the transport.

As shown in FIG. 1, tape reel spindles 20 and 22, the read-write head 26 and the head sockets at the free end of the rods 54, 56, 58 and 60 are all located in the face panel within the perimeter of a forwardly extending annular hood 88 which provides an open faced partial enclosure for the face panel within its perimeter.

The tape reel cartridge 42 is particularly designed to cooperate with the annular hood 88 to provide a substantially dust-free enclosure for the tape reels and the tape processing instrument while a tape record is being either read or a record is being recorded thereon.

The nature of the tape reel cartridge can best be ascertained by reference to FIGS. 2, 4, 5 and 6. The cartridge consists of an enclosing shell having a face panel 90 and side walls 92. The face panel 90 is preferably transparent. A separable reel mounting panel 94 is adapted to form the rear wall of the shell and, it, together with the shell, forms a substantially dust-free tape reel enclosure. The reel mounting panel 94 has a pair of tape reel apertures such as the aperture 96 in FIG. 4. On the inner face of the reel mounting panel 94 is a bridge structure 98 under which a pair of tape reels 100 and 102 may be separably mounted such that their reel driving spindle hubs extend into their respective tape reel apertures. The bridge structure 98 comprises a relatively narrow elongated panel which extends substantially across the width of the cartridge and is spaced from the reel mounting panel 94 a distance somewhat greater than the width of the reels by spacing blocks at both ends and at the middle.

Figure 4:
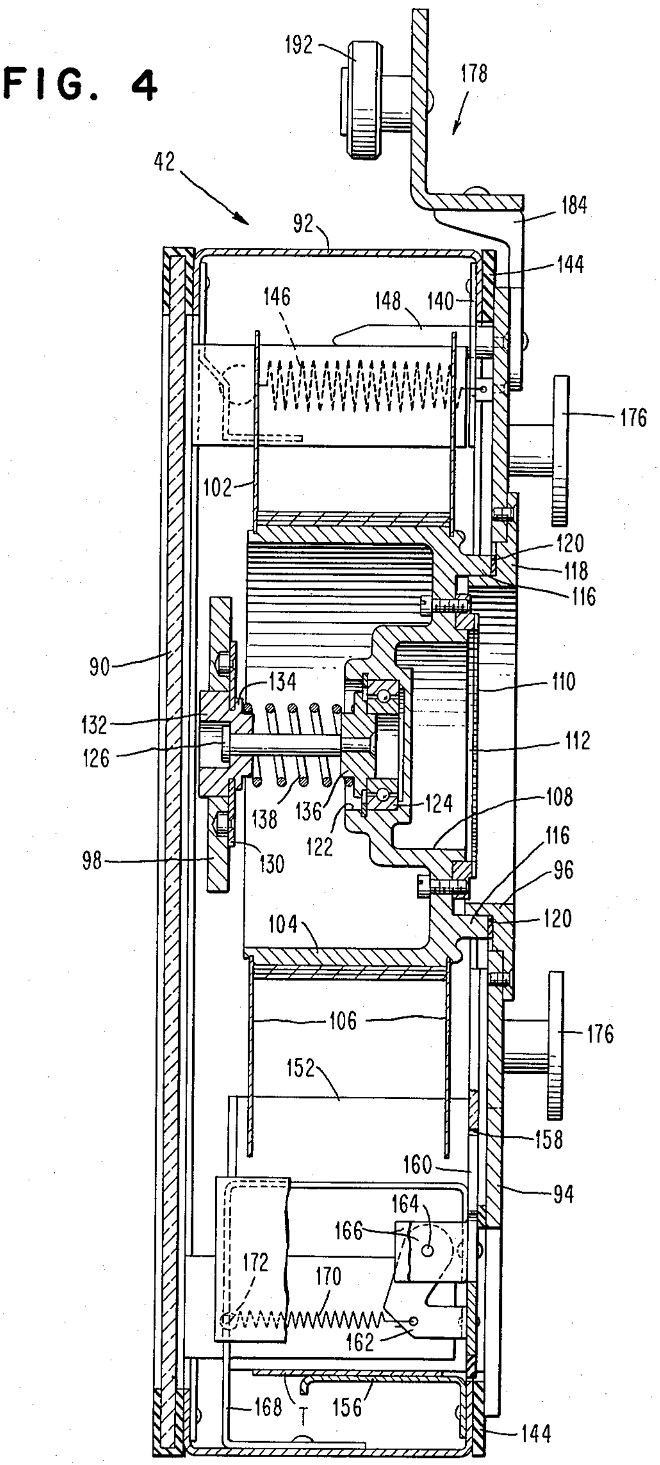
FIG. 4 is an enlarged vertical sectional view through the tape reel cartridge.

The tape reels 100 and 102, as shown in FIG. 4, consist of a hub structure 104, a pair of spaced tape coil flanges 106, and a drive spindle socket 108. The drive spindle socket 108 is generally cup-shaped in complement to the heads of the reel driving spindles 20 and 22 and it contains clutching teeth 110 adapted to engage the corresponding clutching teeth 24 of the drive spindle heads. At the mouth of the drive spindle socket 108 is a resilient annulus 112 which is adapted to engage a base flange 114 of the drive spindle head when the head and the reel socket are in full engagement.

The reel hub also has an outwardly extending annular flange 116 which is adapted to embrace an inwardly extending collar 118 defining the reel hub apertures in the reel mounting panel 94. Seated at the base of the collar 118 is a packing ring 120 which is tightly engaged by the annular flange 116 of the reel except during the processing of tape. Since the drive spindle socket 108 provides no opening to the inner face of the reel, it closes the reel hub against passage of atmosphere from one side to the other of the reel.

Figure 2:
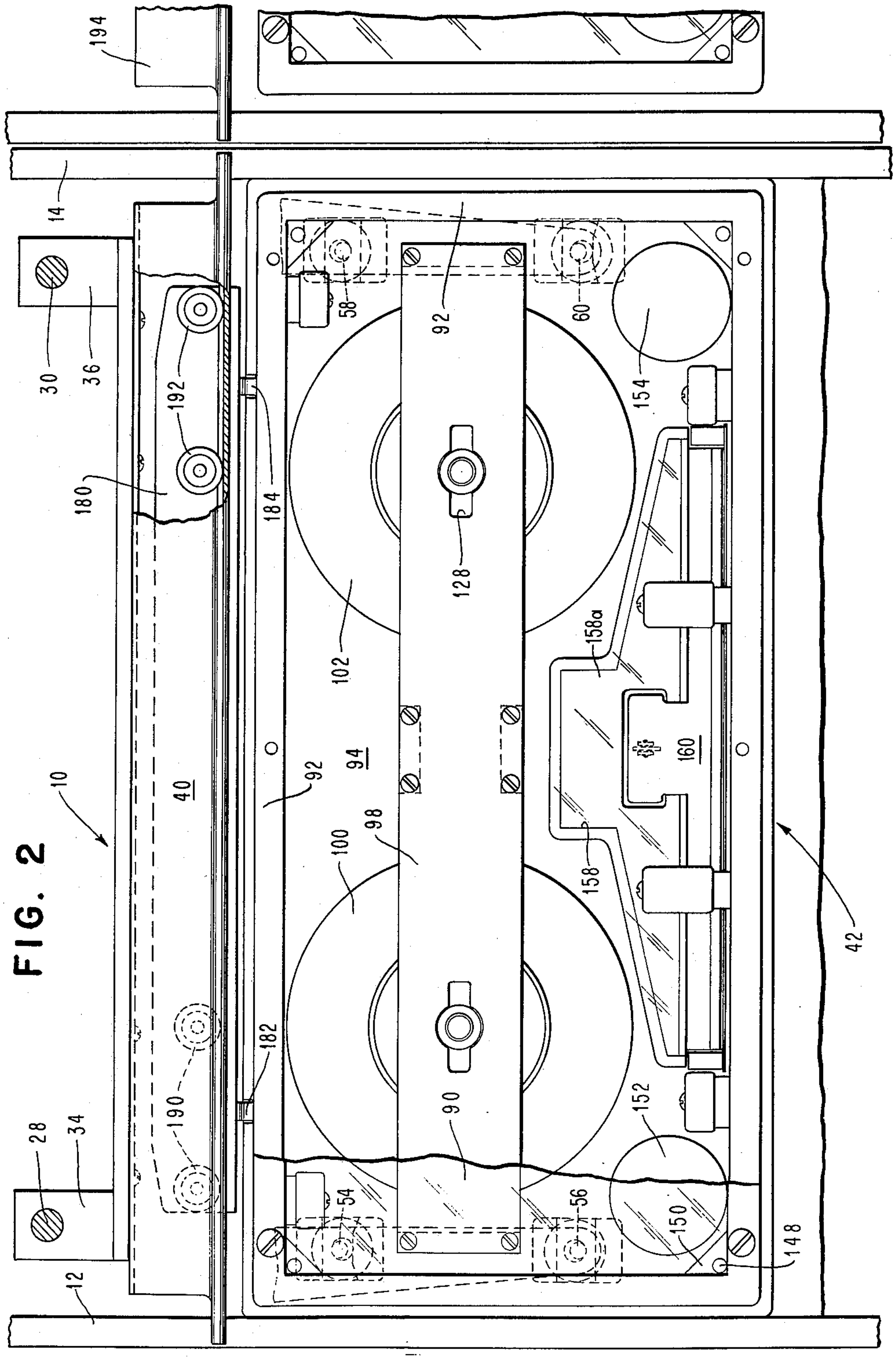
FIG. 2 is a view similar to that of FIG. 1 showing a tape reel cartridge positioned in front of the face panel of the tape transport, parts being broken away to show underlying structure.

The inner face of the drive spindle socket has a recess 122 in which is located a ball bearing ring 124. This ring is designed to take the thrust of a reel mounting stud 126. As best seen in FIG. 2, the bridge structure 98 has a bayonet slot 128 through which the reel mounting stud 126 can be inserted. A reinforcing plate 130 is fixed to the under face of the bridge structure in the area of the slots 128. The mounting stud 126 has a head 132 which has formed in the base thereof a pair of wings 134 adapted to engage under the reinforcing plate 130 when the head 132 is rotated through a quarter turn. This serves to lock the mounting stud 126 within slot 128 when the same is inserted and so rotated. The inner end of the mounting stud 126 has mounted thereon a pedestal 136 which engages the inner race of the ball bearing ring 124. The mounting stud 126 is slidably mounted in its head 132, but is held in its extended position by means of a compression spring 138 which encircles the stud and is restrained at its opposite ends by the head 132 and the pedestal 136, respectively.

The spring 138 is sufficiently strong to hold the reel against the reel mounting panel 94 such that the annular flange 116 of the reel will be maintained in tight contact with the sealing ring 120. This insures that no dust can enter the cartridge between the reel and the reel mounting panel 94.

The annular side walls 92 of the reel cartridge provide inturned flanges 140 which are adapted to abut corresponding inturned flanges 142 formed at the mouth of the annular hood 88. Preferably, a compressible sealing annulus 144 is fixed to the outer face of the inturned flanges 140.

The reel mounting panel 94 is adapted to lie in contact with the sealing annulus 144 when the cartridge is not in use. The closing force on the reel mounting panel 94 is provided by a plurality of resilient extensible members such as tension springs 146 one of which is provided near each corner of the cartridge and internally connect the cartridge shell 92 and the reel mounting panel 94. In order to guide the reel mounting panel 94 into registration with the cartridge shell and thereafter prevent relative lateral movement, the reel mounting panel is provided near each corner thereof with a guide pin 148. These guide pins are adapted to register with a guide hole in a guide plate 150 carried at each corner of the cartridge shell 92.

Figure 5:
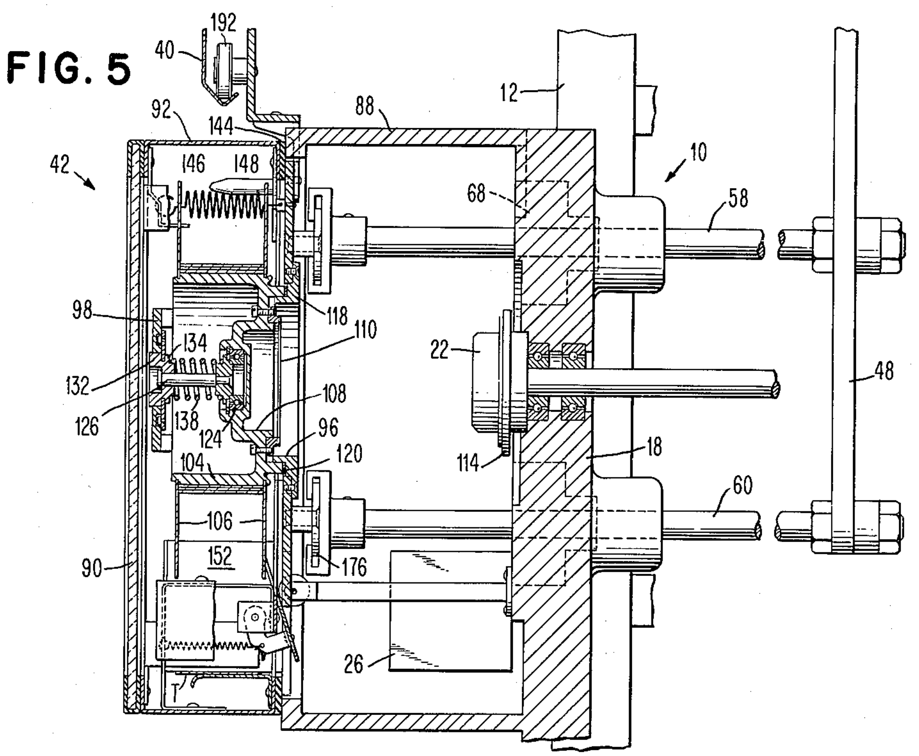
FIG. 5 is a vertical sectional view through the face panel of a tape transport and a tape reel cartridge in preliminary tape loading contact therewith.
Figure 6:
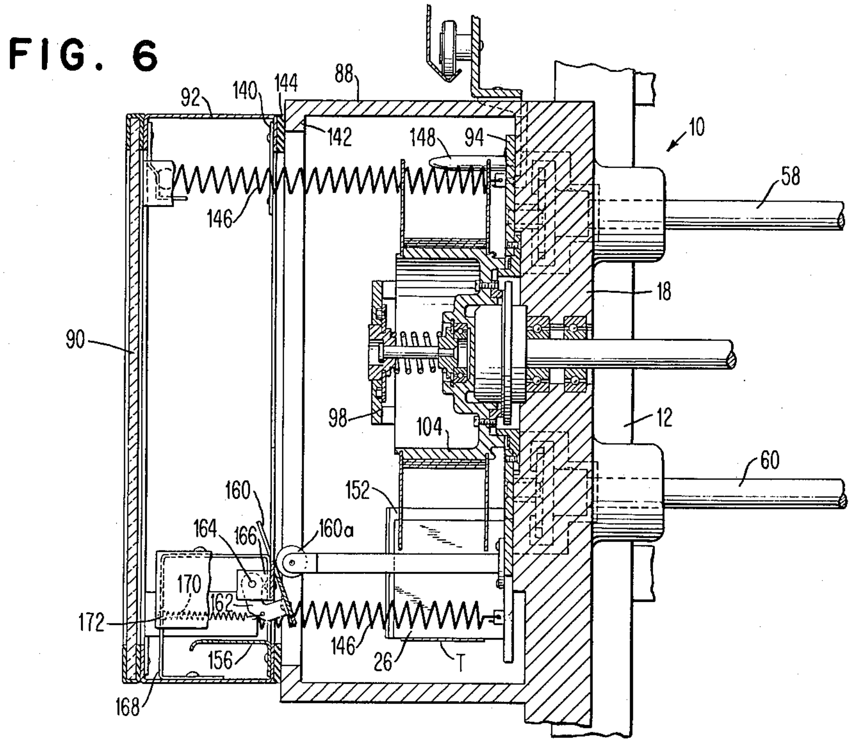
FIG. 6 is a sectional view corresponding to that of FIG. 5, showing, however, the tape reels of the tape reel cartridge loaded upon the reel driving spindles of the transport.
Figure 7:
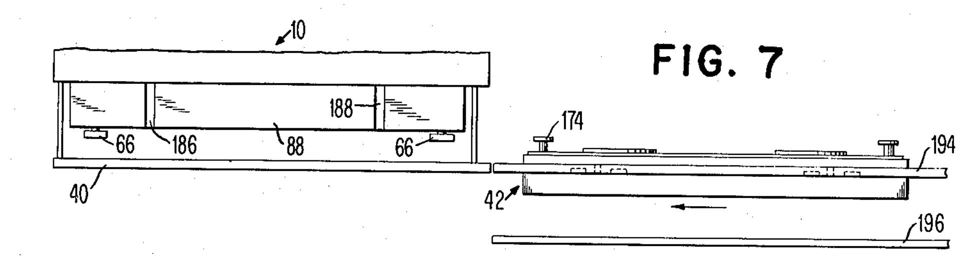
FIG. 7 is a diagrammatic view showing a tape reel cartridge being moved from a storage position to a loading position in front of the tape transport.

By reference to FIGS. 5 and 6, it can be observed that the inturned flange 140 of the cartridge shell 92 extends inwardly beyond the corresponding inturned flanges of the annular hood 88 and that the edges of the reel mounting panel 94 are inset on the inturned flanges 140 sufficiently to permit the panel to pass the corresponding inturned flanges 142 of the hood structure such that it can pass without obstruction into the hood structure for mounting of the reels upon the reel driving spindles.

Mounted upon the reel mounting panel 94 and extending inwardly from the inner face thereof are a pair of tape guides 152 and 154 which are so located that a tape from the reel 100 trained about the guide 152 and then about the guide 154 and returning to the reel 102 will provide a relatively long section of flat tape at the bottom of the cartridge. The bottom flange of the cartridge has attached thereto a tape table 156 which extends inwardly and on which the length of tape between the guides 152 and 154 is adapted to rest.

Since the reel mounting panel 94 is expected to rest in contact with the face panel 18 of the transport while tape is being processed, it has an aperture 158 of adequate shape and sufficient size to clear the read-write head 26 and associated equipment. Closing this aperture during tape storage is a transparent plate 158*a* which is fixed to the bottom wall of the shell. The plate 158*a* is spaced from the bottom of the shell to permit the passage of the tape as the panel 94 is withdrawn from the cartridge. The slot between the bottom edge of the plate 158*a* and the tape table 156 is closed by a door 160. The door 160 is mounted in the shell of the cartridge such that it may be tilted into an open position to permit the length of tape on the tape table 156 to pass as the reel mounting panel 94 is separated from the cartridge shell. The door 160 is mounted on a plurality of L-shaped hangers 162 which are mounted on a shaft 164. The shaft 164 is journalled in spaced brackets 166 fixed to a supporting frame structure 168 attached to the bottom wall of the cartridge shell. A coil spring 170 may be connected between one or more of the hangers 162 and a fixed spring anchor 172 to hold the door 160 against the reel mounting panel 94 at all times except when tape within the cartridge is being processed.

Extending outwardly from the rear face of the reel mounting panel 94 are a plurality of heads 174. These heads correspond in number to the head sockets 66 and are so disposed as to provide a head in cooperative relation with each of the head sockets when a cartridge is moved into operative relation at the front of the transport. Each of the head sockets constitutes an open faced slotted structure which is adapted to receive and embrace a disk 176 constituting part of the heads 174.

A supporting bracket 178 is attached to the upper edge of the reel mounting panel 94. The bracket 178 includes an elongated body structure 180, as best seen in FIG. 2. The lower edge of the body structure 180 is spaced from the upper wall of the cartridge shell. The body structure 180 is attached to the reel mounting panel 94 by a pair of spaced attaching brackets 182 and 184. These brackets are relatively narrow and are located, respectively, near opposite ends of the body structure 180. The position of the attaching brackets 182 and 184 corresponds with a pair of slots 186 and 188 formed in the top wall of the annular hood 88 which surrounds the face panel of the transport. The attaching brackets 182 and 184 are consequently adapted to enter the respective slots 186 and 188 as the reel mounting panel 94 is separated from the cartridge shell and is moved into its ultimate tape processing position against the face panel of the transport, as shown in FIG. 6.

The body structure 180 provides a support for two sets of caster wheels 190 and 192. These wheels extend outwardly from the face of the body structure 180 so that they can engage the track elements 40.

FIGS. 7 through 11 are explanatory diagrams illustrating a complete operating sequence during the loading and unloading of a tape reel cartridge. In these figures is illustrated a loading track element 194 and an unloading track element 196 which are the same as the supporting track element 40 and whose arrangement and purpose is fully developed in said Burke et al. Patent 2,941,738. When a cartridge is delivered to the loading track 194, the slide structure 44 (FIG. 3) is laterally projected to the left to engage the cartridge 42 and shift it from the loading track 194 to the supporting track 40 in front of the transport, all as described in said Burke et al. patent. During the lateral movement of the cartridge 42 from the loading track 194 to the supporting track 40, the several head sockets 66 will engage with their respective heads 174, because at this time the head socket carrying rods are at rest and the lateral slots of the head sockets 66 are in the vertical plane in which the heads 174 move as the cartridge is shifted in a lateral direction.

Figure 8:
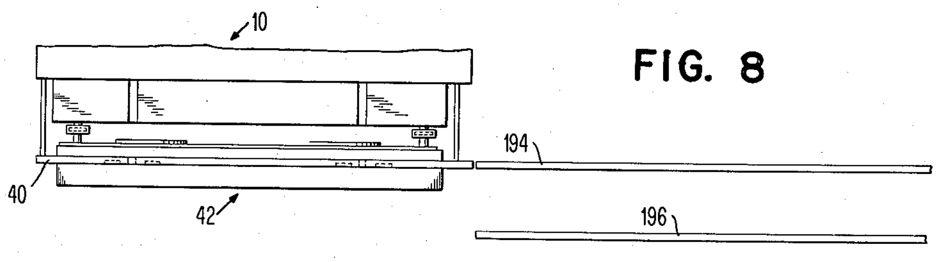
FIG. 8 is a diagrammatic view corresponding to that of FIG. 7 showing the tape reel cartridge in reel loading position and showing the same engaged by loading mechanism.
Figure 9:
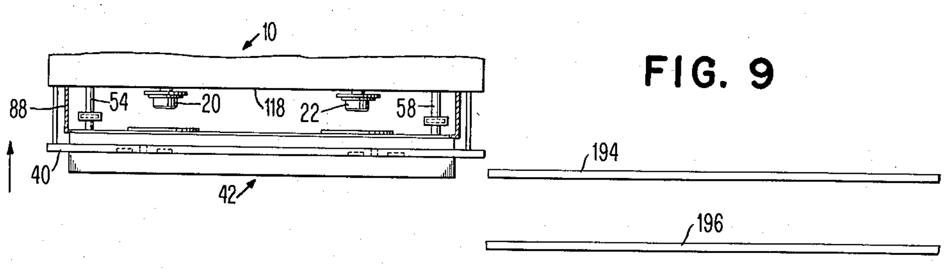
FIG. 9 is a view similar to that of FIG. 8 with the exception that the top of the face panel hood has been broken away and the tape reel cartridge has started moving toward the face panel of the transport.
Figure 10:
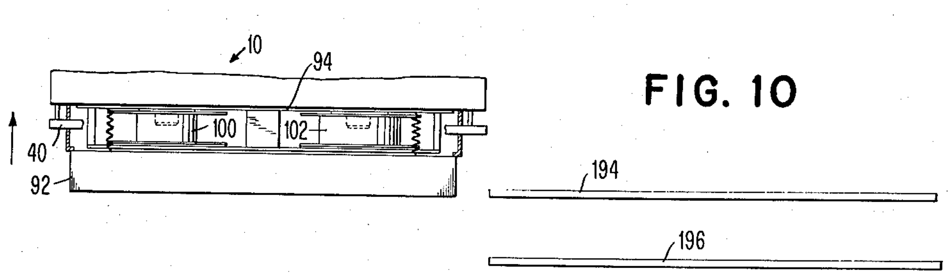
FIG. 10 is a diagrammatic view similar to that of FIG. 9, showing, however, the tape reels mounted on the reel driving spindles of the transport.

When the cartridge 42 has been shifted to the rail 40 and the head sockets 66 and their respective heads 174 are inter-engaged, as shown in FIG. 8, the barrel cam 70 (FIG. 3) will begin to turn such that the supporting plate 32 is moved to the rear. This motion continues until the inturned flanges 140 of the reel cartridge shell engage the corresponding inturned flanges 142 of the annular hood 88. Up to this time, the reel mounting panel 94 has remained in tight contact with the open face of the reel cartridge shell under the influence of the springs 146. When the reel cartridge shell comes into contact with the annular hood 88 further progress thereof in the direction of the transport face panel 18 is halted and the shell is held in tight contact with the hood by the springs 146.

At this point, the door 160 (FIG. 5) must open to permit the length of tape overlying the tape table 156 to pass from the cartridge shell. The door is operated into its open position by means of a door operating finger 160*a* which is fixed to and projects outwardly from the face panel of the transport in a position to engage the door about midway of its length and just slightly above its pivot shaft 164. It will be noted from FIGS. 5 and 6 that the finger 160*a* extends just slightly beyond the open face of the annular hood 88 so that it will come into operative contact with the door 160 as the shell of the cartridge and the annular hood come into contact with each other.

Continued rotation of the barrel cam 70 will now separate the reel mounting panel 94 from the reel cartridge shell and move it into contact with the face panel of the transport such that the reels on the reel mounting panel are engaged with the reel driving spindles 20 and 22. The heads of the reel driving spindles will fully engage with the drive spindle sockets 108 before the reel mounting panel 94 is in contact with the face panel 18 of the transport. Therefore, further rearward movement of the reel mounting panel 94 will serve to free the reels 100 and 102 for rotation. It will be remembered that the annular reel flange 116 is normally in contact with the packing ring 120 which surrounds the inwardly extending collar 118. It is necessary, therefore, to move the reels inwardly against the tension of the compression springs 138 associated with the reel mounting studs 126. When the reels are so inwardly moved to free them from contact with the inner face of the reel mounting panel 94, they will rotate freely under the influence of the reel driving spindles.

Figure 11:
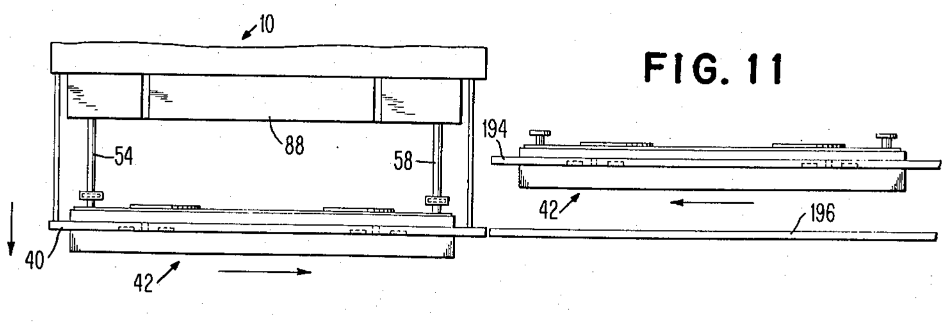
FIG. 11 is a diagrammatic view showing the unloading of tape reel cartridge and the deposit thereof upon a cartridge discharge rail.

After the tape has been processed, the supporting plate 32 will be driven in the opposite direction to remove the reels from the reel driving spindles. As the reel mounting panel 94 is now moved away from the face panel of the transport, the compression springs 138 will again seat the reels such that the annular flange 116 thereof will seat against the sealing ring 120. Continued forward movement of the reel mounting panel 94 will result in the return of the reel mounting panel into contact with the cartridge shell, the guide pins 148 entering the guide holes in their respective guide plates 150 to insure proper registration of the reel mounting panel with the cartridge shell. After the reel mounting panel and the cartridge shell have been brought together, the entire cartridge will move forwardly as a unit. The length of the rods 54, 56, 58 and 60 is such and the shape of the cam groove 74 is also such that during the discharging operation, the cartridge will be moved into alignment with the unloading track 196. The cartridge will come to rest with its supporting track section 40 in alignment with the unloading track section 196, as shown in FIG. 11. When this position has been attained, the slide structure 44 is again operated to engage the cartridge and shift it to the left where it is deposited on the unloading track 196. In the meanwhile, the cartridge for subsequent processing may be brought up on the loading track 194 where it is in position for lateral shifting by the slide structure 44 when the supporting plate 32 is again moved to the rear where the supporting track section 40 is aligned with the loading track section 194.

While the fundamentally novel features of the invention have been illustrated and described in connection with a specific embodiment of the invention, it is believed that this embodiment will enable others skilled in the art to apply the principles of the invention in forms departing from the exemplary embodiment therein, and such departures are contemplated by the claims.

What is claimed is:

1. In a magnetic record tape transport mechanism, a face panel, a pair of tape reel driving spindles adapted to accommodate a pair of tape reels in driving relation and a tape processing head mounted in said face panel, an annular hood extending forwardly from said panel and providing an open faced partial enclosure for said spindles and head, a tape reel cartridge having an enclosing shell and a pair of tape reels separably mounted therein, means for supporting said tape reel cartridge with its shell in substantially dust-tight contact with the open face of said hood and such that a pair of tape reels therein are axially aligned with said driving spindles, and means mounted on said tape transport mechanism adapted to move said reels in an axial direction in respect to said reel driving spindles for mounting and demounting thereon said reels.

2. In a self-loading tape mechanism comprising: a tape transport mechanism having a face panel, a pair of tape reel driving spindles adapted to accommodate a pair of cartridge encased tape reels in driving relation mounted in said panel, a tape processing head mounted in said panel, means for supporting a tape reel cartridge wherein tape reels within such cartridge are axially aligned with said tape reel driving spindles, an annular hood extending forwardly from said panel and providing a partial enclosure for said spindles and head, and means extending through said panel adapted to engage a tape reel cartridge on said supporting means and shift the same into contact with said hood.

3. In a self-loading tape mechanism comprising: a tape transport mechanism having a face panel, a pair of tape reel driving spindles adapted to accommodate a pair of cartridge encased tape reels in driving relation mounted in said panel, a tape processing head mounted in said panel, means for supporting a tape reel cartridge wherein tape reels within such cartridge are axially aligned with said tape reel driving spindles, an annular hood extending forwardly from said panel and providing a partial enclosure for said spindles and head, a plurality of cartridge engaging means mounted for reciprocation in said face panel within the perimeter of said hood adapted to engage a tape reel cartridge on said supporting means and shift the same into contact with said hood, and means mounted behind said panel for reciprocating said arms.

4. In a magnetic record tape transport mechanism, a face panel, a pair of tape reel driving spindles adapted to accommodate a pair of tape reels in driving relation and a tape processing head mounted in said face panel, an annular hood extending forwardly from said panel and providing an open faced partial enclosure for said spindles and head, a tape reel cartridge having an enclosing shell and a separable reel mounting panel, means for supporting said tape reel cartridge with its shell in substantially dust-tight contact with the open face of said hood and such that a pair of tape reels on said reel mounting panel are axially aligned with said driving spindles, and means mounted on said tape transport mechanism adapted to engage said reel mounting panel of a cartridge so mounted and shift the same in an axial direction in respect to said reel driving spindles for mounting and demounting thereon reel mounting panel carried reels.

5. In a magnetic record tape transport mechanism, a face panel, a pair of tape reel driving spindles adapted to accommodate a pair of tape reels in driving relation and a tape processing head mounted in said face panel, an annular hood extending forwardly from said panel and providing an open faced partial enclosure for said spindles and head, a tape reel cartridge having an enclosing shell and a separable reel mounting panel, means for supporting said tape reel cartridge with its shell in substantially dust-tight contact with the open face of said hood and such that a pair of tape reels on said reel mounting panel are axially aligned with said driving spindles, and means within said hood adapted to engage said reel mounting panel of a cartridge so mounted and shift the same in an axial direction in respect to said reel driving spindles for mounting and demounting thereon reel mounting panel carried reels.

6. In a magnetic record tape transport mechanism, a face panel, a pair of tape reel driving spindles adapted to accommodate a pair of tape reels in driving relation and a tape processing head mounted in said face panel, an annular hood extending forwardly from said panel and providing an open faced partial enclosure for said spindles and head, a tape reel cartridge having an enclosing shell and a separable reel mounting panel, means for supporting said tape reel cartridge with its shell in substantially dust-tight contact with the open face of said hood and such that a pair of tape reels on said reel mounting panel are axially aligned with said driving spindles, and means extending through said face panel and within said hood adapted to engage said reel mounting panel of a cartridge so mounted and shift the same in an axial direction in respect to said reel driving spindles for mounting and demounting thereon reel mounting panel carried reels.

7. In a magnetic record tape transport mechanism, a face panel, a pair of tape reel driving spindles adapted to accommodate a pair of tape reels in driving relation and a tape processing head mounted in said face panel, an annular hood extending forwardly from said panel and providing an open faced partial enclosure for said spindles and head, a tape reel cartridge having an enclosing shell and a separable reel mounting panel, means for supporting said tape reel cartridge with its shell in substantially dust-tight contact with the open face of said hood and such that a pair of tape reels on said reel mounting panel are axially aligned with said driving spindles, and means mounted for reciprocation in said face panel adapted to engage said reel mounting panel of a cartridge so mounted and shift the same in an axial direction in respect to said reel driving spindles for mounting and demounting thereon reel mounting panel carried reels.

8. In a magnetic record tape transport mechanism, a face panel, a pair of tape reel driving spindles adapted to accommodate a pair of tape reels in driving relation and a tape processing head mounted in said face panel, an annular hood extending forwardly from said panel and providing an open faced partial enclosure for said spindles and head, a tape reel cartridge having an enclosing shell and a separable reel mounting panel, means for supporting said tape reel cartridge with its shell in substantially dust-tight contact with the open face of said hood and such that a pair of tape reels on said reel mounting panel are axially aligned with said driving spindles, and a plurality of reel mounting panel engaging arms mounted for reciprocation in said face panel and within said hood for engaging said reel mounting panel of a cartridge so mounted and shift the same in an axial direction in respect to said reel driving spindles for mounting and demounting thereon reel mounting panel carried reels.

9. A tape reel cartridge for a self-loading tape transport mechanism comprising: a tape reel enclosing shell having a face panel and side walls, a separable reel mounting panel adapted to constitute the rear wall of said shell and form with said shell a substantially dust-tight tape reel enclosure, a pair of tape reel apertures in said reel mounting panel, means for mounting a pair of tape reels on said reel mounting panel such that the hubs thereof are seated in their respective apertures and said apertures are closed by said reels, and extensible means for separably holding said reel mounting panel in contact with the side walls of said shell.

10. A tape reel cartridge for a self-loading tape transport mechanism comprising: a tape reel enclosing shell having a face panel and side walls, a separable reel mounting panel adapted to constitute the rear wall of said shell and form with said shell a substantially dust-tight tape reel enclosure, a pair of tape reel apertures in said reel mounting panel, means for mounting a pair of tape reels on said reel mounting panel such that the hubs thereof are seated in their respective apertures and said apertures are closed by said reels, and spring means connected between said shell and said reel mounting panel for resiliently and separably holding said reel mounting panel in contact with the side walls of said shell.

11. A tape reel cartridge for a self-loading tape transport mechanism comprising: a tape reel enclosing shell having a face panel and side walls, a separable reel mounting panel adapted to constitute the rear wall of said shell and form with said shell a substantially dust-tight tape reel enclosure, a pair of tape reel apertures in said reel mounting panel, a pair of tape reels having closed drive spindle sockets mounted on said reel mounting panel such that the hubs thereof are seated in their respective apertures, a sealing annulus on each of said reels adapted to seat against the inner face of said reel mounting panel, resilient means within said cartridge for urging said reels toward said reel mounting panel such that said sealing annuli are pressed into engagement with the inner face of said reel mounting panel, and extensible means for separably holding said reel mounting panel in contact with the side walls of said shell,.

12. A tape reel cartridge for a self-loading tape transport mechanism comprising: a tape reel enclosing shell having a face panel and side walls, a separable reel mounting panel adapted to constitute the rear wall of said shell and form with said shell a substantially dust-tight tape reel enclosure, a pair of tape reel apertures in said reel mounting panel, a bridge structure carried by said reel mounting panel for mounting a pair of tape reels on said reel mounting panel such that the hubs thereof are seated in their respective apertures and said apertures are closed by said reels, means mounted in said bridge adapted to yieldingly hold reels mounted on said reel mounting panel, and extensible means for separably holding said reel mounting panel in contact with the side walls of said shell.

13. A tape reel cartridge for a self-loading tape transport mechanism comprising: a tape reel enclosing shell having a face panel and side walls, a separable reel mounting panel adapted to constitute the rear wall of said shell and form with said shell a substantially dust-tight tape reel enclosure, a pair of tape reel apertures in said reel mounting panel, means for mounting a pair of tape reels on said reel mounting panel such that the hubs thereof are seated in their respective apertures and said apertures are closed by said reels, extensible means for separably holding said reel mounting panel in contact with the side walls of said shell, and a plurality of guide pins extending inwardly from said reel mounting panel adapted to engage guide means in said shell as said reel mounting panel is brought into contact with the side walls of said shell.

14. A tape reel cartridge for a self-loading tape transport mechanism comprising: a tape reel enclosing shell having a face panel and side walls, a separable reel mounting panel adapted to constitute the rear wall of said shell and form with said shell a substantially dust-tight tape reel enclosure, a pair of tape reel apertures in said reel mounting panel, means for mounting a pair of tape reels on said reel mounting panel such that the hubs thereof are seated in their respective apertures and said apertures are closed by said reels, and a plurality of coil springs interconnecting said shell and said reel mounting panel for yieldingly and separably holding said reel mounting panel in contact with the side walls of said shell.

References Cited in the file of this patent

UNITED STATES PATENTS 2,941,739 Burke et al. ---------------- June 21, 1960